United States Patent [19]

Sullivan

[11] 3,969,030

[45] July 13, 1976

[54] BALL JOINT WITH COMPOSITE COMPRESSION SPRING

[75] Inventor: Leo S. Sullivan, Dayton, Ohio

[73] Assignee: General Motors Corporation, Detroit, Mich.

[22] Filed: Nov. 10, 1975

[21] Appl. No.: 630,211

[52] U.S. Cl. .............................. 403/132; 403/288; 277/212 F
[51] Int. Cl.² ......................................... F16C 11/06
[58] Field of Search ........... 403/133, 132, 138, 139, 403/131, 288; 277/5, 212 F, 215

[56] References Cited
UNITED STATES PATENTS
3,211,483  10/1965  Sullivan, Jr. ...................... 403/140

FOREIGN PATENTS OR APPLICATIONS
632,700  11/1949  United Kingdom ................. 403/132

Primary Examiner—Andrew V. Kundrat
Attorney, Agent, or Firm—F. J. Fodale

[57] ABSTRACT

A ball joint has a composite compression spring for preloading the ball joint and automatic wear take-up. The composite compression spring comprises an elastomeric element which has a peripheral skirt which seals the juncture between the housing and cover and a thin plastic stabilizer disc bonded to the elastomeric element which controls migration of the elastomeric element under compressive loads.

4 Claims, 4 Drawing Figures

BALL JOINT WITH COMPOSITE COMPRESSION SPRING

This invention relates generally to ball joints and more specifically to preloaded ball joints having an elastomeric spring for preloading the ball joint and automatic wear take-up.

My prior U.S. Pat. No. 3,211,483 issued Oct. 12, 1965, discloses a "Ball Joint and Socket Assembly," having a combination compression spring and bearing seat 32 for preloading the ball joint and automatic wear take-up. The member 32 includes an elastomeric portion 32m with an integral annular sealing lip portion 32s for sealing the juncture between the housing 30 and the cover 34. The bearing seat comprises a preform of Teflon threads 32t interwoven with cotton threads 32f which is impregnated with a thermosetting phenolic resin that is cured simultaneously with the elastomeric portion 32m thus bonding the seat thereto and forming an integral unit.

The prior art British Patent Specification No. 632,700 of Thompson Products, Inc., accepted Nov. 28, 1949 discloses a ball and socket joint having a rubber or the like washer 29 for preloading the ball joint and automatic wear take-up and features a metal retainer 27 for controlling the migration of the rubber washer 29 when compressive loads are applied thereto.

While Teflon bearing seats, such as shown in my prior patent may be suitable for some applications, in some instances, it is preferable to utilize a metal bearing seat. I have found that when a metal bearing seat is utilized in combination with an elastomeric spring having a peripheral sealing skirt, the elastomeric spring tends to migrate around and under the movable metal bearing seat under compressive loads encountered in heavy duty applications which may result in looseness and excessive bearing wear. While the aforementioned British Specification does show a metal retainer for controlling migration of a rubber or rubber-like spring, the British arrangement does not involve a sealing problem such as is encountered in the type of ball joint disclosed in my prior U.S. Patent. Furthermore, the British arrangement has several drawbacks, among which are the handling of a separate rigid metal retainer having a thickness which detracts from the capacity of the rubber spring, the requirement for accurately machined parts, and severe limitations on the shape and capacity of the rubber spring.

The principle object of my invention is to provide a ball joint having a movable metal bearing seat in combination with an elastomeric spring having an integral annular sealing skirt in which the migration of the elastomeric spring under compressive loads is controlled in a simple and efficient manner.

A feature of my invention is that the migration of the elastomeric spring is controlled by a relatively thin stabilizer disc bonded to a surface of the elastomeric spring.

Another feature of my invention is that the migration of the elastomeric spring is controlled by a relatively thin plastic stabilizer disc which may be molded integrally with the elastomeric element.

Yet another feature of my invention is the use of a composite compression spring which includes a stabilizer disc for controlling migration and which properly orients the movable metal bearing seat thereby avoiding the necessity of a precise sliding fit between the bearing seat and the bore of the housing.

Still yet another feature of my invention is the use of a composite compression spring which may include a central lubricant passage and a relatively thin plastic stabilizer disc bonded to the elastomeric element which controls migration of the elastomeric element toward its center when under compression to minimize the restriction of the lubricant passage.

Still yet another feature of my invention is the use of a composite compression spring which includes a relatively thin plastic stabilizer disc which readily conforms to a surface of the movable bearing seat and which prevents substantially tilting of the movable bearing seat in the housing.

The exact nature of this invention as well as other objects and advantages thereof will be readily apparent from consideration of the following specification relating to the annexed drawing in which.

Figure 1:
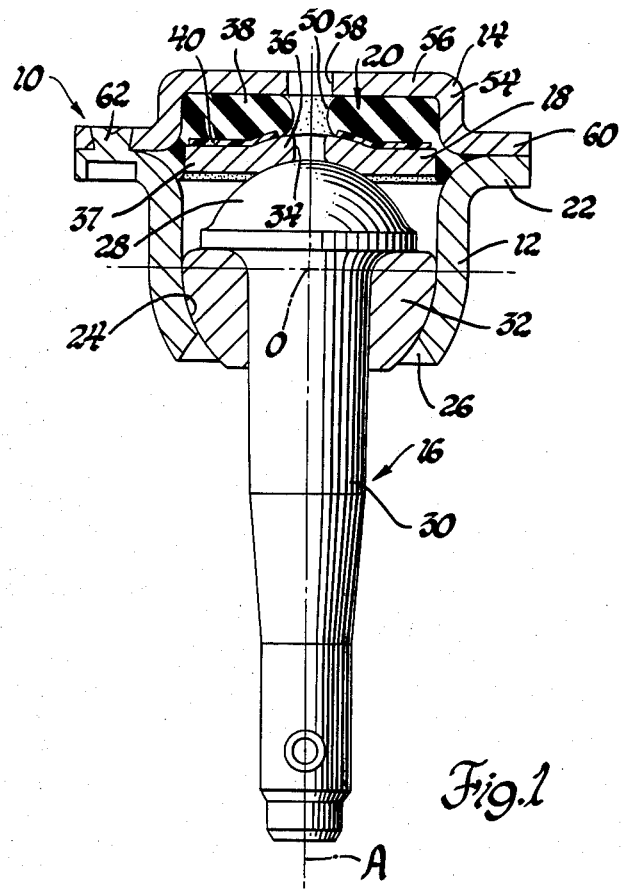
FIG. 1 is a partially sectioned elevation view of a ball joint having a composite compression spring in accordance with my invention.

Referring now to the drawing, FIG. 1 illustrates a ball joint 10 comprising a housing 12 and cover 14, a ball stud unit 16, a movable bearing seat 18 and a composite compression spring 20.

The housing 12 is a die-formed part having an outward peripheral flange 22 at an open end thereof. The opposite end portion of the housing is curved inwardly forming an internal substantially partispherical fixed bearing seat 24 which establishes a center 0 for the housing 12 and terminates adjacent a reduced opening 26. The ball stud unit 16 comprises an integral head 28 and elongated stud 30 of reduced diameter which is journalled in an annular complementary head 32 which engages a shoulder at the juncture of the head 28 and stud 30. The heads 28 and 32 have outer concentric substantially partispherical surfaces and forms a ball portion of the stud unit 16 which permits the longitudional axis A of stud unit 16 to rock about the center 0 of the housing 12 when the head 32 engages the fixed bearing 24 of the housing 12, as shown in FIG. 1.

The head 28 is in turn engaged by the movable bearing seat 18 which is a case hardened stamped disc having a central hole 34 surrounded by a central dome shaped portion 36 which matingly engages the substantially partispherical surface of the head 28. Wear between the heads 28 and 32 forming the ball portion and between the ball portion and the bearing seats 24 and 36 is automatically taken up in the axial direction by the composite compression spring 20 which is compressed between the bearing seat 36 and the cover 14.

Figure 2:
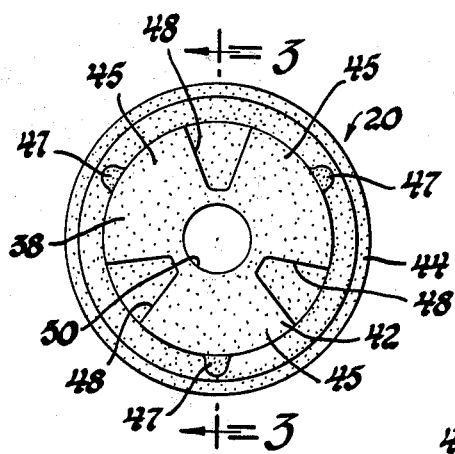
FIG. 2 is a top view of the composite compression spring shown in FIG. 1.
Figure 3:
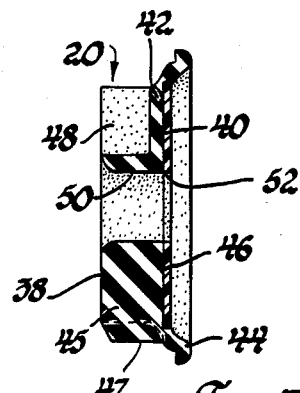
FIG. 3 is a section of the composite compression spring taken substantially along the line 3—3 of FIG. 2.
Figure 4:
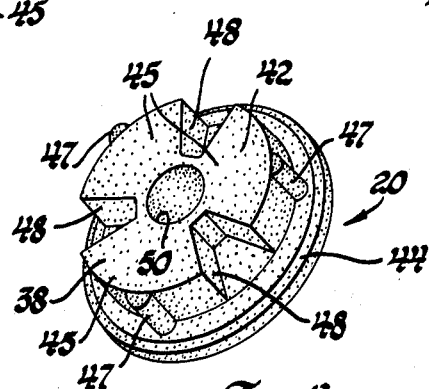
FIG. 4 is a perspective view of the composite compression spring shown in FIGS. 2 and 3.

Referring now to FIGS. 2, 3 and 4, the composite compression spring 20 is shown in its free state and comprises an elastomeric element 38 and a relatively thin plastic stabilizer disc 40. The elastomeric element 38 comprises a generally annular body portion 42 having a depending peripheral skirt portion 44 which flares outwardly in a direction away from a flat end surface 46 of the annular body portion 42. The annular body portion 42 has three equally circumferentially spaced lug portions 45 of uniform height or thickness in the axial direction separated by three equally circumferentially spaced generally V-shaped notches 48. The lug portions 45 have integral partcylindrical projections 47 which locate the composite compression spring 20 with respect to the cover 14 with spaces therebetween in the transverse direction. The notches 48 also provide spaces for expansion of the annular body portion 42 in the transverse direction when the composite compression spring 20 is under compression in the axial direction.

The stabilizer disc 40 which has a thickness on the order of 0.035 inches comprises a fibrous backing embedded in a thermosetting substantially rigid plastic material, such as a cotton duck cloth embedded in a phenolic resin. The stabilizer disc 40 is bonded to the flat surface 46 of the annular body portion 42 of the elastomeric element 38.

The elastomeric element 38 may be a natural rubber or a synthetic rubber-like material. The fibrous backing of the stabilizer disc is preferably embedded in a thermosetting resin, such as a phenolic resin which is compatible with the natural rubber or synthetic rubber-like material for simultaneous curing therewith whereby the resin bonds the stabilizer disc 40 to the elastomeric element 38 during a single curing process thereby avoiding the necessity of a separately applied adhesive. In such an instance, the stabilizer disc 40 is preferably supplied as a preform comprising a fibrous cloth-like backing impregnated with a phenolic resin which is partially cured. The preform is then placed in a mold cavity in which the elastomeric element is molded and cured while simultaneously completing the cure of the phenolic resin. A procedure for simultaneously curing a natural rubber or synthetic rubber-like material and phenolic resin impregnating a fibrous backing is set forth in my aforementioned U.S. Pat. No. 3,211,483.

The purpose of the stabilizer disc 40 is to inhibit migration of the elastomeric element 38, particularly migration of the annular portion 42 past the outer edge of the movable bearing seat 18 when high compressive loads are applied to the bearing seat 18 by the ball stud unit 16. To this end, the stabilizer disc 40 preferably has an outer diameter slightly greater than the diameter of the lugs 45 as shown in FIG. 3 and nearly equal to the diameter of the movable bearing seat 18 as shown in FIG. 1.

In assembly, the stabilizer disc 40 of the composite compression spring 20 engages an end surface of the movable bearing seat 18, and because of its thinness is sufficiently resilient to conform to the central dome shaped portion 36. The flat peripheral portion 37 of bearing seat 18 is engaged by portions of the stabilizer disc 40 aligned with the lug portions 45 which prevent any substantial tilting of the movable bearing seat 18 in the housing.

The cover 14 is a die formed part having a hat shaped cross section. The cover 14 comprises a cylindrical wall portion 54, a circular end wall portion 56 having a central aperture 58, and an outward flange 60. The central aperture 58 receives a lubricant fitting (not shown), and is aligned with a central aperture 50 through the elastomeric element 38, a central aperture 52 through the stabilizer disc 40 and the central aperture 34 of the movable bearing seat 18 forming a lubricant passage. In its free state the apertures 50 and 52 of the composite compression spring 20 are of substantially the same diameter and somewhat larger than the diameter of the aperture 34, and thus the stabilizer disc 40 inhibits migration of the elastomeric element 38 toward its center to prevent any significant restriction of the lubricant passage, as shown in FIG. 1.

The cover 14 is attached to the housing 12 by securing the flange 60 to the flange 22 in any suitable manner. As illustrated in FIG. 1 the flanges are secured to each other by a plurality of extruded studs 62 (one shown) of the flange 22 which are disposed in mating holes of the flange 60 and staked. Since the housing 12 and the cover 14 are die formed parts the juncture of the flanges 22 and 60 forms an internal crevice shaped groove. In assembly, the peripheral skirt 44 of the elastomeric element 38 is compressively received in the crevice shaped groove to seal the juncture between the flanges 22 and 60 and is also biased against the outer peripheral edge of the movable bearing seat 18 to center it.

As is evident from FIG. 1, the elastomeric element 38, particularly the annular body portion 42 is under compression in the axial direction. Under such conditions there is a tendency for an elastomeric spring such as the elastomeric element 38 to migrate out from under the applied load around and under the peripheral edge of the movable bearing seat 18 since rubber or rubber-like materials are incompressible. However, the stabilizer disc 40, bonded to the body portion 42 inhibits such migration and the tendency is for the annular body portion to expand laterally into the spaces provided by the projections 47 and the notches 48. The stabilizer disc 40 also inhibits lateral migration of the body portion 42 toward its center to prevent any significant restriction of the aperture 50 forming part of the lubricant passage to the interior of the housing 12.

I wish it to be understood that I do not desire to be limited to the exact details of construction shown and described, for obvious modifications will occur to a person skilled in the art.

I claim:
1. A ball joint comprising:
    a housing having an outward peripheral flange at an open end thereof and a reduced opening at the opposite end,
    a ball stud unit having a ball portion engaging a fixed bearing seat in said housing adjacent said reduced opening and a stud portion disposed outwardly of said reduced opening;
    a movable bearing seat disposed in said housing and having a dome shaped central portion engaging said ball portion,
    a hat-shaped cover having an outward peripheral flange secured to the outward peripheral flange of said housing and forming an internal crevice shaped peripheral groove at the juncture therewith; and
    a composite compression spring disposed between said cover and said movable bearing seat preloading said bearing seats into engagement with said ball portion and taking up wear therebetween,
    said composite compression spring comprising an elastomeric element having a depending peripheral skirt portion adjacent an outer peripheral edge of said upper bearing seat which seals the junction between said housing and said cover, and
    a stabilizer disc bonded to an end surface of said elastomeric element inward of said skirt portion and engaging a surface of said movable bearing seat for inhibiting the migration of said elastomeric element past the outer peripheral edge of said movable bearing seat responsive to compressive loads applied to said elastomeric element via said movable bearing seat.

2. A ball joint comprising:
a housing having an outward peripheral flange at the open end thereof and a reduced opening at the opposite end;
a ball stud unit having a ball portion engaging a fixed bearing seat in said housing adjacent said reduced opening and a stud portion disposed outwardly of said reduced opening;
a movable metal bearing seat disposed in said housing and having a dome shaped central portion engaging said ball portion and a contiguous eccentric or non-spherical marginal portion having an outer diameter;
a hat-shaped cover having an outward peripheral flange secured to the outward peripheral flange of said housing and forming an internal crevice shaped peripheral groove at the juncture therewith; and
a composite compression spring disposed between said cover and said movable bearing seat preloading said bearing seats into engagement with said ball portion and taking up wear therebetween,
said composite compression spring comprising an elastomeric element having a generally annular body portion, a depending peripheral skirt portion surrounding an end surface thereof, said peripheral skirt portion being adjacent an outer peripheral edge of said movable bearing seat and sealing the juncture between said housing and said cover,
and a thin plastic stabilizer disc having an outer diameter nearly equal to the outer diameter of the movable bearing seat bonded to said end surface of said elastomeric element and engaging said marginal portion of said movable bearing seat for inhibiting migration of said body portion around and under said outer peripheral edge of said movable bearing seat responsive to compressive loads applied to said elastomeric element via said movable bearing seat.

3. A ball joint comprising:
a housing having an outward peripheral flange at the open end thereof and a reduced opening at the opposite end;
a ball stud unit having a ball portion engaging a fixed bearing seat in said housing adjacent said reduced opening and a stud portion disposed outwardly of said reduced opening;
a movable metal bearing seat disposed in said housing and having a dome shaped central portion engaging said ball portion and a flat marginal portion;
a hat-shaped cover having an outward peripheral flange secured to the outward peripheral flange of said housing and forming an internal crevice shaped peripheral groove at the juncture therewith; and
a composite compression spring disposed between said cover and said movable bearing seat preloading said bearing seats into engagement with said ball portion and taking up wear therebetween,
said composite compression spring comprising an elastomeric element having a generally annular body portion, a depending peripheral skirt portion which flares outwardly from a flat end surface thereof and which is adjacent an outer peripheral edge of said movable bearing seat and seals the juncture between said housing and said cover,
said body portion having a plurality of circumferentially spaced lug portions of substantially uniform height defined in part by said flat end surface, and
a stabilizer disc bonded to said flat end surface of said elastomeric element and engaging said flat marginal portion of said movable bearing seat for inhibiting migration of said body portion around and under an outer peripheral edge of said movable bearing seat responsive to compressive loads applied to said elastomeric element via said movable bearing seat.

4. A ball joint comprising:
a housing having an outward peripheral flange at the open end thereof and a reduced opening at the opposite end;
a ball stud unit having a ball portion engaging a fixed bearing seat in said housing adjacent said reduced opening and a stud portion disposed outwardly of said reduced opening;
a movable metal bearing seat disposed in said housing and having a dome shaped central portion engaging said ball portion and a flat marginal portion;
a hat-shaped cover having an apertured end wall for receiving a lubricant fitting, a cylindrical wall and an outward peripheral flange secured to the outward peripheral flange of said housing and forming an internal crevice shaped peripheral groove at the juncture therewith; and
a composite compression spring disposed between said cover and said movable bearing seat preloading said bearing seats into engagement with said ball portion and taking up wear therebetween,
said composite compression spring comprising an elastomeric element having a generally annular body portion with a central aperture of a given diameter, a depending peripheral skirt portion which flares outwardly from a flat end surface thereof and which is adjacent an outer peripheral edge of said movable bearing seat and seals the juncture between said housing and said cover,
said body portion having a plurality of circumferentially spaced notches defining lug portions of substantially uniform height defined in part by said flat end surface, said lugs having partcylindrical projections engaging said cylindrical wall, and
a thin plastic stabilizer disc having a central aperture aligned with said central aperture of said body portion and having a diameter substantially equal to said given diameter,
said stabilizer disc being bonded to said flat end surface of said elastomeric element and engaging said dome shaped and flat marginal portion of said movable bearing seat for inhibiting migration of said body portion around and under an outer peripheral edge of said movable bearing seat and toward its center responsive to compressive loads applied to said elastomeric element via said movable bearing seat.

* * * * *